(12) United States Patent
Turng et al.

(10) Patent No.: US 8,691,126 B2
(45) Date of Patent: Apr. 8, 2014

(54) METHOD OF FABRICATING AN INJECTION MOLDED COMPONENT

(75) Inventors: Lih-Sheng Turng, Madison, WI (US); Jun Peng, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 75 days.

(21) Appl. No.: 13/008,401

(22) Filed: Jan. 18, 2011

(65) Prior Publication Data

US 2012/0181729 A1   Jul. 19, 2012

(51) Int. Cl.
  *B29C 44/38* (2006.01)
  *B29C 45/47* (2006.01)
(52) U.S. Cl.
  USPC .................. 264/41; 264/51; 264/328.17
(58) Field of Classification Search
  USPC ................... 264/328.17, 41, 51, 53
  See application file for complete search history.

(56) References Cited

U.S. PATENT DOCUMENTS

| | | | |
|---|---|---|---|
| 3,488,412 A * | 1/1970 | Bielfeldt et al. | 264/39 |
| 3,575,931 A * | 4/1971 | Sherman | 524/104 |
| 3,730,918 A | 5/1973 | Teti et al. | |
| 4,331,619 A | 5/1982 | Chung et al. | |
| 4,806,294 A | 2/1989 | Lapierre et al. | |
| 5,679,723 A | 10/1997 | Cooper et al. | |
| 5,837,177 A * | 11/1998 | DiNardo et al. | 264/101 |
| 6,103,255 A | 8/2000 | Levene et al. | |
| 6,221,924 B1 * | 4/2001 | Mori et al. | 521/50 |
| 6,228,898 B1 * | 5/2001 | Nakanishi | 521/82 |
| 6,306,424 B1 | 10/2001 | Vyakarnam et al. | |
| 6,322,347 B1 | 11/2001 | Xu | |
| 6,333,029 B1 | 12/2001 | Vyakarnam et al. | |
| 6,365,149 B2 | 4/2002 | Vyakarnam et al. | |
| 6,534,084 B1 | 3/2003 | Vyakarnam et al. | |
| 6,626,950 B2 | 9/2003 | Brown et al. | |
| 6,692,761 B2 | 2/2004 | Mahmood et al. | |
| 6,746,685 B2 | 6/2004 | Williams | |
| 6,773,713 B2 | 8/2004 | Bonassan et al. | |
| 6,852,330 B2 | 2/2005 | Bowman et al. | |
| 6,884,428 B2 | 4/2005 | Binette et al. | |
| 7,098,292 B2 * | 8/2006 | Zhao et al. | 528/272 |
| 7,112,417 B2 | 9/2006 | Vyakarnam et al. | |
| 2002/0091226 A1 | 7/2002 | Nichols et al. | |
| 2004/0010048 A1 | 1/2004 | Evans et al. | |
| 2004/0026811 A1 | 2/2004 | Murphy et al. | |
| 2005/0107868 A1 | 5/2005 | Nakayama et al. | |
| 2005/0165475 A1 | 7/2005 | Noh | |
| 2005/0187322 A1 | 8/2005 | Park et al. | |
| 2006/0002978 A1 | 1/2006 | Shea et al. | |
| 2006/0083771 A1 | 4/2006 | Yamamoto et al. | |

(Continued)

OTHER PUBLICATIONS

Haugen et al, "A Novel Processing Method for Injection-Molded Polyether-Urethane Scaffolds. Part 1: Processing", Wiley InterScience (www.interscience.wiley.com) DOI: 10.1002/jbm.b. 30396, Oct. 20, 2005, pp. 65-72.

(Continued)

*Primary Examiner* — Jill Heitbrink
(74) *Attorney, Agent, or Firm* — Boyle Fredrickson, S.C.

(57) ABSTRACT

A method of fabricating a foamed, injection-molded component is provided. The method includes the step of introducing a liquid, a nucleating agent and a polymer into an injection barrel of an injection molding machine. The liquid, the nucleating agent and the polymer are injected into a mold corresponding in shape to the component and the component is released from the mold.

9 Claims, 3 Drawing Sheets

(56) References Cited

U.S. PATENT DOCUMENTS

| | | |
|---|---|---|
| 2006/0153814 A1 | 7/2006 | Lio et al. |
| 2006/0264599 A1 | 11/2006 | Anno et al. |
| 2009/0017094 A1* | 1/2009 | Turng et al. ............... 424/426 |
| 2009/0082507 A1* | 3/2009 | Egashira et al. ............ 524/425 |

OTHER PUBLICATIONS

Shao, Xin Xin et al, "Evaluation of a hybrid scaffold/cell construct in repair of high-load-bearing osteochondral defects in rabbits", Biomaterials 27 (2006) pp. 1071-1080.

Nho, Shane J. et al, "Patellofemoral Osteochondral Autologous Transfer, Techniques in Knee Surgery", 5(2), pp. 134-137, 2006.

Mikos, Antonios G. et al, Preparation and characterization of poly (L-lactic acid) foams, Polymer, vol. 35, No. 5, 1994, pp. 1068-1077.

Mooney, David J. et al, "Novel approach to fabricate porous sponges of poly (D,L-lactic-coglycolic acid) without the use of organic solvents", Biomaterials 17 (1996), 1417-1422.

Nam, Yoon Sung et al, "A novel fabrication method of macroporous biodegradable polymer scaffolds using gas foaming salt as a porogen additive", Journal of Biomedical Materials Research (Applied Biomaterials) 53:1-7, 2000.

Harris, Leatrese et al, "Open Pore Biodegradable matrices formed with gas foaming", Journal of Biomedical Materials Research, vol. 42, No. 3, Dec. 5, 1998, pp. 396-402.

Washburn, Newell R. et al, "Co-extrusion of biocompatible polymers for scaffolds with co-continuous morphology", Journal of Biomedical Materials Research, vol. 60, No. 1, pp. 20-29.

Wang, Xiaoxi et al, "Solvent Free Fabrication of Biodegradable Porous Polymers", Proceedings of Imece04, pp. 595-602, 2204, American Society of Mechanical Engineers, New York, NY.

Wu, Linbo et al, "A 'room-temperature' injection molding/particulate leaching approach for fabrication of biodegradable three-dimensional porous scaffolds", Biomaterials, 27 (2006), pp. 185-191.

Leicher, S. et al, "MuCell(R) technology for injection molding: A processing method for polyether-urethane scaffolds", Journal of Materials Science, 40 (17): 4613-4618.

Reignier, Joel et al, "Preparation of Interconnected Polycaprolactone Porous Scaffolds by a Combination Polymer and Salt particulate Leaching", Proceedings of ANTEC 2005, pp. 2550-2554.

Neves, Nuno M. et al, "The morphology, mechanical properties and ageing behavior of porous injection molded starch-based blends for tissue engineering scaffolding", Materials Science & Engineering, C25 (2205) pp. 195-200.

Hagen, H. et al, "A Novel Processing Method for Injection-Molded Polyether-Urethane Scaffolds. Part 1: Processing", Journal of Biomedical Materials Research Part B—Applied Biomaterials, vol. 77B, No. 1 (Apr. 2006), pp. 65-72.

* cited by examiner

| SAMPLES | SALT CONCENTRATION IN SOLUTION (wt%) | SALT SOLUTION FEED RATE (ml/min) | SHOT VOLUME (cm$^3$) | NITROGEN OR WATER (wt%) | PACKING TIME (s) | BACK PRESSURE (bar) |
|---|---|---|---|---|---|---|
| PC-S | ---- | ---- | 20.5 | ---- | 4.3 | 10 |
| PC-N | ---- | ---- | 19.5 | 0.22 | 0 | 55 |
| PC-W-1 | 2.0 | 0.5 | 20.5 | 1.89 | 0 | 55 |
| PC-W-2 | 2.0 | 0.5 | 19.5 | 1.98 | 0 | 55 |
| PC-W-3 | 2.0 | 1.0 | 20.5 | 3.77 | 0 | 55 |
| PC-W-4 | 2.0 | 1.0 | 19.5 | 3.96 | 0 | 55 |
| PC-W-5 | 4.0 | 0.5 | 20.5 | 1.89 | 0 | 55 |
| PC-W-6 | 4.0 | 0.5 | 19.5 | 1.98 | 0 | 55 |
| PC-W-7 | 4.0 | 1.0 | 20.5 | 3.77 | 0 | 55 |
| PC-W-8 | 4.0 | 1.0 | 19.5 | 3.96 | 0 | 55 |

FIG. 3

| | YOUNG'S MODULUS (MPa) | SPECIFIC YOUNG'S MODULUS (MPa*m$^3$/Kg) | ULTIMATE STRENGTH (MPa) | SPECIFIC ULTIMATE STRENGTH (MPa*m$^3$/Kg) | STRAIN AT BREAK (mm/mm) |
|---|---|---|---|---|---|
| PC-S | 1.00E+03 | 8.69E-01 | 6.39E+01 | 5.55E-02 | 2.48 |
| PC-N | 8.83E+02 | 8.89E-01 | 4.70E+01 | 4.74E-02 | 0.24 |
| PC-W-1 | 1.01E+03 | 9.52E-01 | 5.17E+01 | 4.86E-02 | 0.18 |
| PC-W-2 | 9.72E+02 | 9.56E-01 | 4.90E+01 | 4.81E-02 | 0.16 |
| PC-W-3 | 9.86E+02 | 9.34E-01 | 4.99E+01 | 4.73E-02 | 0.17 |
| PC-W-4 | 9.66E+02 | 9.43E-01 | 4.91E+01 | 4.79E-02 | 0.16 |
| PC-W-5 | 9.86E+02 | 9.34E-01 | 5.09E+01 | 4.82E-02 | 0.17 |
| PC-W-6 | 9.52E+02 | 9.34E-01 | 4.87E+01 | 4.78E-02 | 0.15 |
| PC-W-7 | 1.0E+03 | 9.45E-01 | 5.11E+01 | 4.83E-02 | 0.15 |
| PC-W-8 | 9.66E+02 | 9.39E-01 | 4.88E+01 | 4.75E-02 | 0.14 |

FIG. 4

METHOD OF FABRICATING AN INJECTION MOLDED COMPONENT

FIELD OF THE INVENTION

This invention relates generally to injection molding, and in particular, to a method for fabricating an injection molded component with better surface quality and lower weight than prior components.

BACKGROUND AND SUMMARY OF THE INVENTION

As is known, microcellular injection molding is a process wherein a supercritical fluid is introduced into a liquid polymer prior to the polymer being injected into a mold. The polymer solidifies in the mold to form a desired component. The introduction of the supercritical fluid prior to injection of the polymer into the mold causes tiny bubbles to be distributed throughout the molded component. By providing tiny bubbles in the molded component, the amount of material necessary to mold the component is reduced, while the dimensional stability of the molded component is improved. Hence, this microcellular injection molding process, often referred to as "microcellular foaming," allows for the production of lightweight and dimensionally stable plastic components with complex geometries while reducing the amount of raw material.

By way of example, Xu, U.S. Pat. No. 6,322,347 discloses a system and a method for the production of foams, and, in particular microcellular foams. The systems include a restriction element that reduces the backflow of polymer melt in an extruder while polymeric material is injected into a mold or ejected from a die. The restriction element is positioned upstream of a blowing agent injection port to maintain the solution of polymer and blowing agent in the extruder above a minimum pressure throughout an injection or ejection cycle, and preferably above the critical pressure required for the maintenance of a single-phase solution of polymer and blowing agent. Typically, the blowing agent is a gas, e.g., nitrogen gas, in its supercritical state. It is contemplated for the system to be used in injection molding, blow molding, or any other processing technique that includes injection or ejection cycles. In some embodiments, the system utilizes a reciprocating screw for injection or ejection of the single-phase solution. In other embodiments, the system includes an accumulator connected to an outlet of the extruder, in which a plunger moves to inject polymeric material into a mold or eject polymeric material from a die.

While functional for its intended purpose, the system and method disclosed in the '347 patent has certain disadvantages. Initially, it is noted that specialized equipment disclosed in the '347 patent, along with the need for supercritical fluids or blowing agents, increases the price of this technology. Further, the surface quality of components fabricated in accordance with the system and method of the '347 patent have a tendency to be irregular and/or rough. As such, there exists a need for a method of fabricating injection molded components which costs less and which produces components with better surface quality than current methods.

Therefore, it is a primary object and feature of the present invention to provide a method for fabricating injection molded components.

It is a further object and feature of the present invention to provide a method for fabricating injection molded components which produces components having better surface qualities than those components produced by current methods.

It is a still further object and feature of the present invention to provide a method for fabricating injection molded components which produces lightweight components with comparable properties as those produced by current methods, but at a lower cost.

It is a still further object and feature of the present invention to provide a method for fabricating injection molded components which is simple and may be performed with standard injection molding machinery.

In accordance with the present invention, a method of fabricating an injection-molded component is provided. The method includes the step of introducing a liquid, a nucleating agent and a polymer into an injection barrel of an injection molding machine. The liquid, the nucleating agent and the polymer are injected into a mold corresponding in shape to the component and the component is released from the mold.

The injection molding machine includes a hopper communicating with the injection barrel. The liquid, the nucleating agent and the polymer are introduced into the hopper prior to introduction in the injection barrel. Thereafter, the polymer is plasticized in the injection barrel. It is contemplated for the liquid to be water and for the nucleating agent to be a salt, although common fillers such as talc and nanoclay may also used. The nucleating agent may be dispersed in the liquid prior to introduction into the injection barrel and/or dissolved in the liquid prior to introduction into the injection barrel. An additive may also be introduced into the injection barrel. The additive alters a physical characteristic of the formed component.

In accordance with a further aspect of the present invention, a method of fabricating an injection-molded component is provided. The method includes the steps of dispersing a nucleating agent in a liquid, and introducing the liquid and a polymer into an injection barrel of an injection molding machine. The liquid and the polymer are injected into a mold corresponding in shape to the component. Thereafter, the component is released from the mold.

The injection molding machine includes a hopper communicating with the injection barrel. The liquid with the nucleating agent dispersed therein and the polymer are introduced into the hopper prior to introduction in the injection barrel. Thereafter, the polymer is plasticized in the injection barrel. It is contemplated for the liquid to be water and for the nucleating agent to be a salt, such as sodium chloride, although common fillers such as talc and nanoclay may also be used as the nucleating agent. The nucleating agent may be dispersed in the liquid by dissolution in the liquid. An additive may also be introduced into the injection barrel. The additive alters a physical characteristic of the formed component.

In accordance with a still further aspect of the present invention, a method of fabricating an injection-molded component is provided. The method includes the step of introducing the liquid and a polymer into an injection barrel of an injection molding machine. The polymer is plasticized in the injection barrel, and the liquid and the polymer are injected into a mold corresponding in shape to the component. Thereafter, the component is released from the mold.

The injection molding machine includes a hopper communicating with the injection barrel. The liquid, the nucleating agent and the polymer are introduced into the hopper prior to introduction in the injection barrel. It is contemplated for the liquid to be water and for the nucleating agent to be a salt, although common fillers such as talc and nanoclay may also be used as the nucleating agent. The nucleating agent may be dispersed in the liquid prior to introduction into the injection barrel and/or dissolved in the liquid prior to introduction into the injection barrel. An additive may also be introduced into the injection barrel. The additive alters a physical characteristic of the formed component.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 3 is a graphical representation of various molding parameters used to fabricate components in accordance with the methodology of the present invention and components in accordance with conventional solid injection molding and current microcellular injection molding processes; and FIG. 4 is a graphical representation of the mechanical properties of components fabricated in accordance with the methodology of the present invention as compared to components fabricated with conventional solid injection molding and current microcellular injection molding processes.

DETAILED DESCRIPTION OF DRAWINGS

Figure 1:
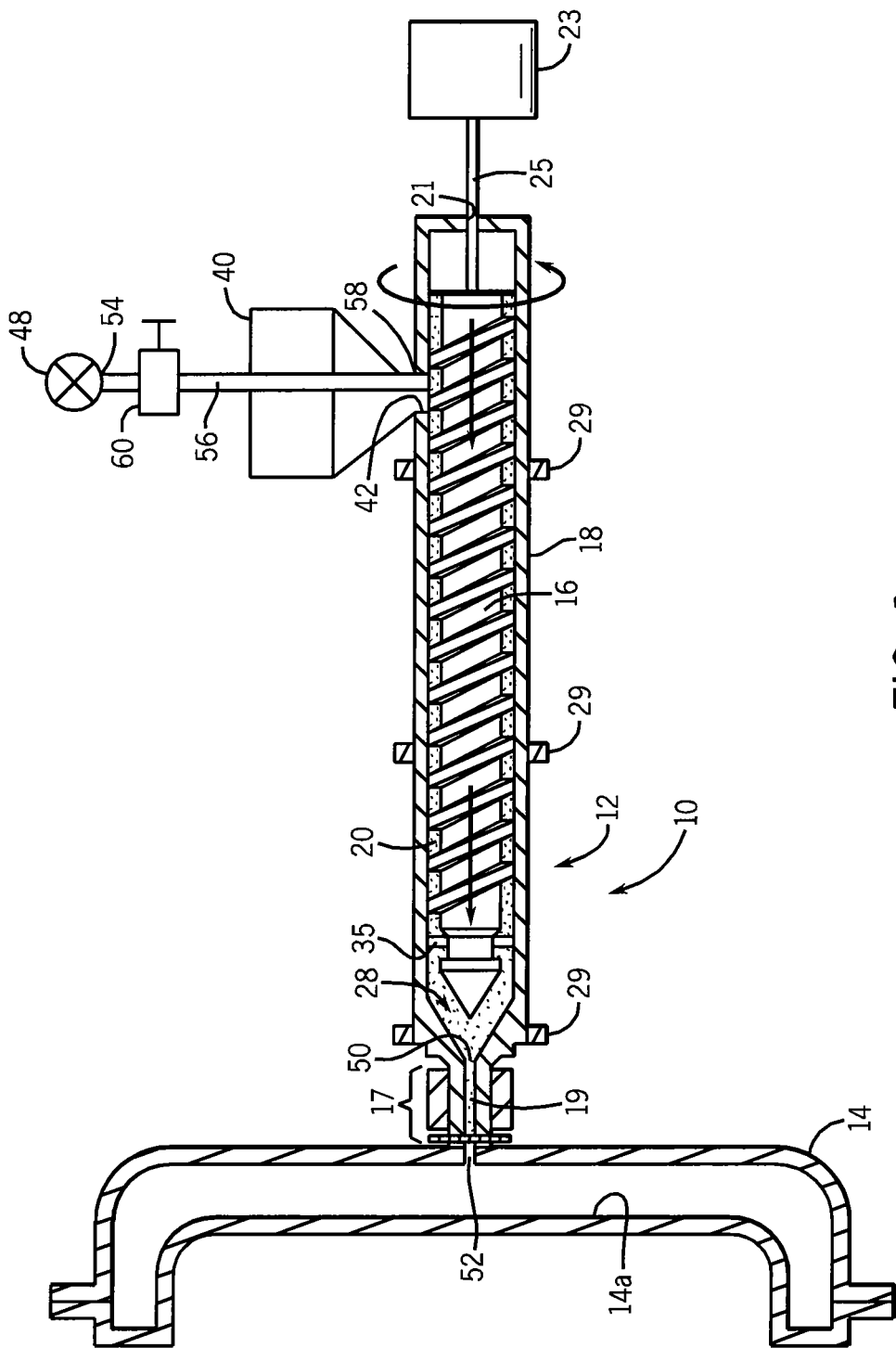
FIG. 1 is a schematic view of an injection molding machine for use in performing the methodology of the present invention.

Referring to FIG. 1, an injection molding machine for use in performing the methodology of the present invention is generally designated by the reference numeral 10. Injection molding machine 10 includes extruder 12 fluidly connected to mold 14. Screw 16 extends along a longitudinal axis and is rotatably supported within barrel 18 to convey polymeric material downstream within polymer processing space 20 toward mold 14. Barrel 18 is adapted to receive polymeric materials that are fluidic, or can form a fluid that subsequently hardens to form a conventional, or solid, polymeric article or component. Barrel 18 includes a first end fluidly connected to mold 14 through an optional nucleating pathway 19 of nozzle 17 and a second, opposite end having aperture 21 extending therethrough. Drive motor 23 is operatively connected to screw 16 by drive shaft 25 extending through aperture 21 in second end of barrel 18. Drive motor 23 is operatively connected to a controller (not shown) for controlling rotational and axial movement of screw 16.

Injection molding machine 10 includes hopper 40 for introducing material into barrel 18. The material in hopper 40 is delivered into polymer processing space 20 within barrel 18 through orifice 42. Polymer processing space 20 is defined by the outer surface of screw 16 and the inner surface of barrel 18. It is noted that the material (e.g. polycarbonate) may be in the form of solid pellets introduced through orifice 42 and plasticized within barrel 18. In connection with the present invention, it is noted a fluidic stream of polymeric material is established in the barrel 18.

A plurality of temperature control units 29 are positioned along barrel 18. For example, control units 29 can take any suitable form such as electrical heaters or the like. It is intended for control units 29 to heat a stream of pelletized or fluid polymeric material within barrel 18 to facilitate melting and/or cooling of the stream to control viscosity. Control units 29 can operate differently at different locations along barrel 18. For example, a first portion of control units 29 may heat the stream at one or more locations along barrel 18, while a second portion of the control units 29 may cool the stream at one or more different locations along barrel 18.

Injection molding machine 10 further includes restriction element 35 upstream of hopper 40 to maintain the polymeric material at sufficient pressure throughout the injection process. Restriction element 35 is one example of an arrangement in which extruder 12 is constructed and arranged to maintain the material in within polymer processing space 20 downstream of inlet 50 of an optional nucleating pathway 19 at a relatively high pressure through an injection or ejection cycle, hereinafter described. Restriction element 35 can take any of a variety of forms known in the art for restricting the upstream flow of polymer material, such as a blister, a dam across the feed-section of the screw, a reverse screw flight, a valve or a ring check valve.

In order to form the component in accordance with the methodology of the present invention, it is contemplated to provide a polymeric material, e.g., polycarbonate, polystyrene, polypropylene or low-density polyethylene, in a pelletized form in hopper 40. A nucleating agent, such as nanoclay, is dispersed in a liquid, such as water ($H_2O$), and provided in storage container 48. Alternatively, the nucleating agent such as a salt, e.g., sodium chloride (NaCl), calcium chloride ($CaCl_2$), or magnesium chloride ($MgCl_2$) may be dissolved in the liquid in order to fully disperse the nucleating agent in the liquid. Input 54 of tubing 56 is operatively connected to the output of storage container 48 and output 58 of tubing 56 is operatively connected to polymer processing space 20 of barrel 18 at orifice 42. Valve 60 may be provided in tubing 56 to selectively control the flow of the nucleating agent/liquid mixture into polymer processing space 20 of barrel 18.

At the beginning of an injection cycle, screw 16 is axially positioned adjacent the first end of barrel 18 in an initial position. The pelletized polymeric material and the liquid having the nucleating agent dispersed/dissolved therein is delivered into polymer processing space 20 in barrel 18 through orifice 42. Screw 16 is rotated to urge the polymeric material downstream such that the mechanical energy generated by rotation of screw 16 and control units 29 plasticize the polymeric material in polymer processing space 20 in barrel 18. The liquid with the nucleating agent dispersed/dissolved therein is mixed and dissolved into polymeric material via screw 16 to form a mixture with numerous water and/or water vapor droplets dispersed in the plasticized polymeric material, and/or a solution defined by the plasticized polymeric material having water dissolved therein. Screw 16 maintains sufficient back pressure at all times to prevent the loss of pressure within extruder 12. The solution travels towards and accumulates in accumulation region 28 within barrel 18 downstream of screw 16.

Once a sufficient volume of the mixture/solution has accumulated in the accumulation region 28, screw 16 is moved in a downstream direction so as to inject the solution into the optional nucleating pathway 19 through inlet 50 thereof. As the solution passes through the optional nucleating pathway 19, the pressure drop in the nucleating pathway 19 or in the mold causes the liquid (e.g., water) or the pressurized water vapor droplets to take on a gaseous or expanded state and form bubbles in the polymeric material. The nucleating agent (i.e., the salt) reduces the size of the bubbles formed in the polymeric material and increases the bubble density. As a result, a large number of bubble nuclei are produced in the polymeric material. The nucleated polymeric material is injected into the molding chamber of mold 14 through outlet 52 of nucleating pathway 19. After injection, screw 16 once again rotates to build up the polymeric material in the accumulation region 28 for the next injection.

The nucleated polymeric material received in the molding chamber of mold 14 begins to cool as soon as the nucleated polymeric material contacts inner surface 14a of mold 14. The molding chamber of mold 14 is filled with the nucleated polymeric material and the nucleated polymeric material solidifies into a part as it cools. After a sufficient time period has passed, the cooled part may be ejected from mold 14. As is conventional, the size and shape of the fabricated component corresponds to the size and shape of the molding chamber of mold 14. Mold 14 is opened and the part is ejected therefrom. Once the fabricated component is ejected, mold 14 is closed and the process may be repeated.

Referring to Table 1, a series of tensile test bars were molded in order to examine the weight and mechanical properties of components fabricated in accordance with the methodology of the present invention as compared to components fabricated with conventional solid injection molding and current microcellular injection molding processes. Using microcellular injection molding machine 10, a first, solid tensile test bar (PC-S) was fabricated solely from a commercial grade polycarbonate (PC) with a melt flow rate of 10.5 g/10 min (300° C./1.2 kg). A second tensile test bar (PC-N) was fabricated from the commercial grade polycarbonate having supercritical fluid, e.g. nitrogen $N_2$, introduced therein prior to injection of the polycarbonate into mold 14. Finally, a series of tensile test bars (PC-W-1: PC-W-8) were fabricated under various molding parameters in accordance with the methodology of the present invention. More specifically, salt (NaCl) was dissolved in water and mixed into the polycarbonate via screw 16 to form a mixture with numerous water and/or water vapor droplets dispersed in the plasticized polycarbonate material, and/or a solution defined by the plasticized polycarbonate material having water dissolved therein. Screw 16 is maintained at a sufficient back pressure, e.g. 55 bars, at all times to prevent the loss of pressure within extruder 12. The solution travels towards and accumulates in accumulation region 28 within barrel 18 downstream of screw 16. Once a sufficient volume of the mixture/solution has accumulated in the accumulation region 28, screw 16 is moved in a downstream direction so as to inject the solution into an optional nucleating pathway 19 through inlet 50 thereof. As the solution passes through the optional nucleating pathway 19, the pressure drop in the optional nucleating pathway 19 or in the mold causes the water or the pressurized water vapor droplets to take on a gaseous or expanded state and form bubbles in the polycarbonate material. The nucleated polycarbonate material is injected into the molding chamber of mold 14 through outlet 52 of the optional nucleating pathway 19 so as to form one of the series of tensile test bars (PC-W-1: PC-W-8). The process is repeated with varying injection molding parameters in a wide processing window to fabricate tensile test bars (PC-W-1: PC-W-8). Table 1 depicts the molding parameters used to fabricate tensile test bars (PC-S; PC-N; and PC-W-1: PC-W-8), together with the calculated nitrogen and water contents of the molded tensile test bars (PC-S; PC-N; and PC-W-1: PC-W-8) in terms of weight percentage (the negligible weight of salt in the water was ignored).

Depending on the water or supercritical fluid content and expandability of each material, many different shot volumes were tried and, in the end, two shot volumes (19.5 and 20.5 cm³) were selected to ensure maximum material savings and complete filling of molding chamber of mold 14 without shrinkage. As shown in Table 1, the average weight reduction of the microcellular injection molded tensile test bar (PC-N) and the water-assisted microcellular injection molded tensile test bars (PC-W-1: PC-W-8) was approximately 10% as compared to the conventional solid injection tensile test bar (PC-S). The weight reduction was calculated on the basis of only the tensile test bars, i.e., without runners and sprue. For the fabrication of all of the molding tensile test bars (PC-N; and PC-W-1: PC-W-8), the volumetric injection flow rate for foamed parts was set at 60 cm³/s and the nozzle (melt) temperature and coolant (mold) temperature were set at 300° C. and 85° C., respectively. Since the expansion of cells compensated for the volumetric shrinkage of the solidifying melt, no packing stage was needed when fabricating the microcellular injection molded tensile test bar (PC-N) and the water-assisted microcellular injection molded tensile test bars (PC-W-1: PC-W-8). A packing time of 4.3 seconds was used in the fabrication of the conventional solid injection tensile test bar (PC-S). Finally, a cooling time was set at 40 seconds for all the tensile test bars (PC-S; PC-N; and PC-W-1: PC-W-8) fabricated.

After fabrication of the molded tensile test bars (PC-S; PC-N; and PC-W-1: PC-W-8), two-dimensional surface roughness (2D-SR) measurements were taken of each via a surface roughness analyzer. As is known, a surface roughness analyzer amplifies the deflection of a stylus and calculates a surface roughness parameter, Ra, from a reading. The surface roughness parameter, Ra, is the arithmetic mean of the departures of the profile from the mean line and may be used to quantify the roughness of a sample. In the present example, the stylus traversed 2.5 mm of each molded tensile test bar (PC-S; PC-N; and PC-W-1: PC-W-8) in a predetermined direction on the surfaces thereof at a fixed rate of 0.25 mm/s.

Figure 2:
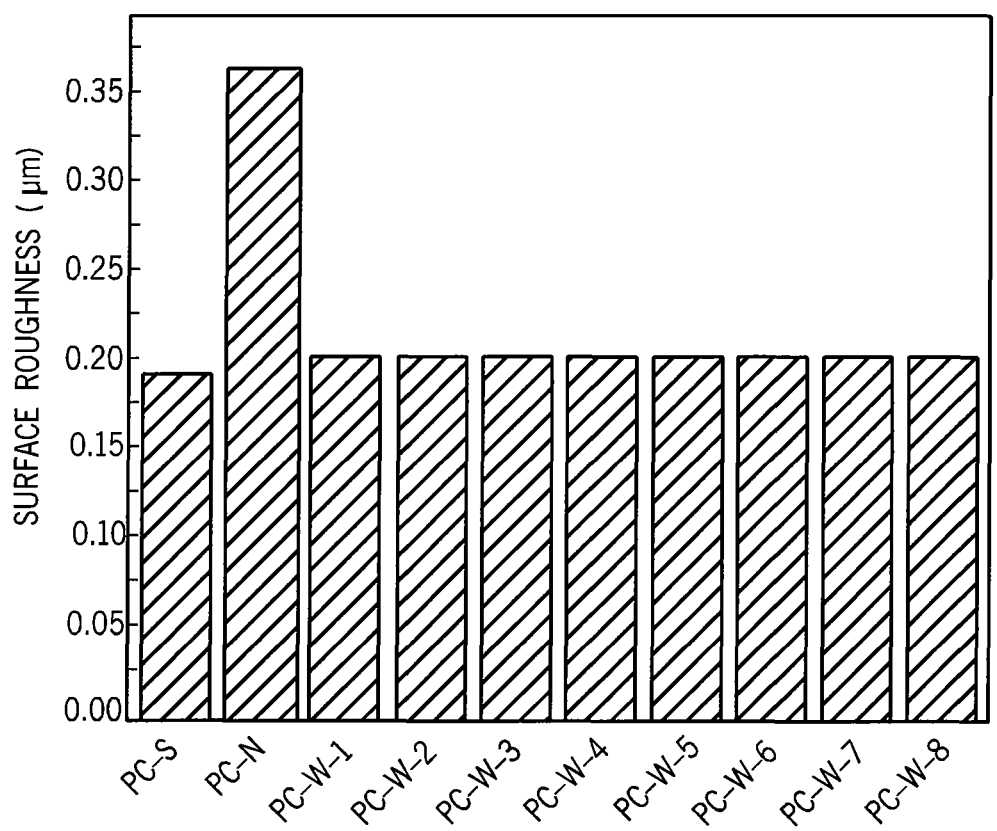
FIG. 2 is a graphical representation of the surface roughness of components fabricated in accordance with the methodology of the present invention as compared to components fabricated with conventional solid injection molding and current microcellular injection molding processes.

Referring to FIG. 2, based upon the data collected, it is evident that the solid injection molded tensile test bar (PC-S) exhibited the lowest surface roughness. However, it is also apparent that the water-assisted microcellular injection molded tensile test bars (PC-W-1: PC-W-8) fabricated in accordance with the methodology of the present invention also exhibited low surface roughness as compared to the microcellular injection molded tensile test bar (PC-N). In fact, the surface roughness of the water-assisted microcellular injection molded tensile test bars (PC-W-1: PC-W-8) fabricated in accordance with the methodology of the present invention was comparable to that of the solid injection molded tensile test bar (PC-S). Further, it is noted that all of the water-assisted microcellular injection molded tensile test bars (PC-W-1: PC-W-8) had similar surface qualities despite variations in salt concentrations, water feeding rates, and shot volumes. As such, it can be appreciated that the methodology of the present invention is fairly robust in producing molded parts with desirable surface qualities.

Referring to Table 2, a graphical representation of the mechanical properties of the components fabricated in accordance with the methodology of the present invention (PC-W-1: PC-W-8) as compared to the components fabricated with conventional solid injection molding and current microcellular injection molding processes (PC-S and PC-N) is provided. More specifically, Table 2 depicts the values of average mechanical properties (such as Young's modulus, ultimate strength, and strain at break of tensile test bars according to the ASTM D638-03 standard) of the molded tensile test bars (PC-S; PC-N; and PC-W-1: PC-W-8). In addition, Table 2 also lists the specific Young's modulus and ultimate strength to take into account the lighter part weight and lesser material used in the foamed parts. It can be understood that the water-assisted microcellular injection molded tensile test bars (PC-W-1: PC-W-8) have a higher specific Young's modulus than the conventional solid injection molded tensile test bar (PC-S) and the microcellular injection molded tensile test bar (PC-N). This is a result of the addition of salt to the water-assisted microcellular injection molded tensile test bars (PC-W-1: PC-W-8), which not only serves as a nucleating agent, but also acts as a rigid reinforcing filler. It is typical for polymer composites with rigid mineral additives to exhibit a higher Young's modulus at the expense of ductility.

It can be appreciated that various types of liquids and/or liquid blowing agents may be used in the methodology of the present invention a substitute for water, as heretofore described. For example, hydrofluorocarbons (HFCs), hydrocarbons (HCs), glycerol, dimethyl sulfoxide (DMSO) or methylpyrrolidone (NMP) may be use instead of water. Further, it is contemplated to add one or more additives to the polymeric material, liquid and nucleating agent in polymer processing space 20 of barrel 18, as heretofore described, in order to provide fabricated components with special physical characteristics such as antimicrobial surfaces or self-healing parts. More specifically, by providing an additive to the combination of the polymeric material, liquid and nucleating agent in polymer processing space 20 of barrel 18, the bubbles formed in the component may contain the additive and become functionalized. Similarly, colored bubbles may be fabricated by dissolving a nucleating agent, such as $CuSO_4$ (light blue) and $FeCl_3$ (light brown), into the liquid so as to add color to the component. Alternatively, to enhance the ductility or toughness of the fabricated component, one can introduce micro- or nano-particles, such as nanoclay, talc, nano $SiO_2$, cellulose nanofibers, or elastomeric core-shell particles, into the liquid to be mixed into the polymeric material. It is contemplated for these micro- or nano-particles to also serve as the nucleating agent.

Various modes of carrying out the invention are contemplated as being within the scope of the following claims particularly pointing and distinctly claiming the subject matter that is regarded as the invention.

We claim:

1. A method of fabricating an injection-molded component, comprising the steps of:
dispersing a nucleating agent in a liquid, the liquid including water;
introducing a polymer directly into an injection barrel of an injection molding machine;
introducing the liquid and nucleating agent directly into the injection barrel of the injection molding machine, at least a portion of the liquid and the nucleating agent being isolated from the polymer prior to introduction into the injection barrel;
plasticizing the polymer in the injection barrel;
mixing the liquid and nucleating agent into the plasticized polymer;
injecting the mixed liquid, nucleating agent and polymer into a mold corresponding in shape to the component; and
releasing the component from the mold.

2. The method of claim 1 wherein the nucleating agent is a salt.

3. The method of claim 1 wherein the nucleating agent is dissolved in the liquid prior to introduction into the injection barrel.

4. The method of claim 1 comprising the additional step of introducing an additive into the injection barrel, the additive altering a physical characteristic of the formed component.

5. A method of fabricating an injection-molded component, comprising the steps of:
dispersing a nucleating agent in a liquid, the liquid including water;
introducing the liquid directly into an injection barrel of an injection molding machine;
introducing a polymer into the injection barrel of the injection molding machine, the polymer being isolated from at least a portion of the liquid prior to introduction into the injection barrel;
plasticizing the polymer in the injection barrel;
mixing the liquid into the plasticized polymer;
injecting the mixed liquid and polymer into a mold corresponding in shape to the component; and
releasing the component from the mold.

6. The method of claim 5 wherein the nucleating agent is a salt.

7. The method of claim 5 wherein the nucleating agent is sodium chloride.

8. The method of claim 5 comprising the additional step of introducing an additive into the injection barrel, the additive altering a physical characteristic of the formed component.

9. The method of claim 5 wherein the step of dispersing the nucleating agent in the liquid includes the step of dissolving the nucleating agent in the liquid.

* * * * *